US005808216A

United States Patent [19]

Fisher, IV

[11] Patent Number: 5,808,216

[45] Date of Patent: Sep. 15, 1998

[54] SIMPLIFIED TREMOLO FOR A STRINGED MUSICAL INSTRUMENT

[76] Inventor: Charles H. Fisher, IV, P.O. Box 402, Coalport, Pa. 16627-0402

[21] Appl. No.: 753,005

[22] Filed: Nov. 19, 1996

[51] Int. Cl.[6] .......... G01D 3/00

[52] U.S. Cl. .......... 84/313

[58] Field of Search .......... 84/298, 299, 312 R, 84/313

[56] References Cited

U.S. PATENT DOCUMENTS

| | | | |
|---|---|---|---|
| 3,237,502 | 3/1966 | Moseley | 84/307 |
| 3,466,962 | 9/1969 | Cole | 84/312 |
| 4,457,201 | 7/1984 | Storey | 84/313 |
| 4,572,049 | 2/1986 | Tanaka et al. | 84/313 |
| 4,681,011 | 7/1987 | Hoshino | 84/313 |
| 4,724,737 | 2/1988 | Fender | 84/313 |
| 4,796,505 | 1/1989 | Takeuchi | 84/313 |
| 4,932,302 | 6/1990 | Saijo | 84/313 |
| 5,127,298 | 7/1992 | Snape et al. | 84/313 |
| 5,175,387 | 12/1992 | Greory | 84/313 X |
| 5,196,641 | 3/1993 | Schaller | 84/313 X |
| 5,429,028 | 7/1995 | Fisher, IV | 84/313 |
| 5,481,955 | 1/1996 | Goto | 84/313 |
| 5,637,817 | 6/1997 | Sherman | 84/313 |

FOREIGN PATENT DOCUMENTS

| | | | |
|---|---|---|---|
| H905447 | 9/1962 | United Kingdom | 84/313 |

*Primary Examiner*—William M. Shoop, Jr.
*Assistant Examiner*—Jeffrey W. Donels
*Attorney, Agent, or Firm*—Gipple & Hale; John S. Hale

[57] ABSTRACT

A string mounting and tuning device for a stringed musical instrument having an L-shaped member formed with a saddle platform and an integral attachment block is pivotally disposed within a cavity in the body of the stringed instrument with a surface of the L-shaped member being substantially coplanar with a flat surface of the instrument body. The attachment block defines a plurality of stepped bores, each of which hold one end of a string of the stringed instrument and the saddle platform is formed with a saddle support plate provided with an apertured flange holding longitudinal adjustment screws, each screw threadably engaging a string saddle guide allowing the position of each saddle guide to be separately adjusted.

A biasing assembly comprising a spring member mounted at one end to the attachment block and mounted at the other end to a spring anchor member balances the rotational force exerted on the L-shaped member caused by the instrument strings. A pivot point assembly is provided beneath the surface of the saddle platform to pivotally receive conical pivot points allowing the L-shaped member to be rotated when a tremolo arm rotatably mounted in the saddle platform is pulled or depressed.

19 Claims, 8 Drawing Sheets

8'
8'
40
45
47
49
50
53
55
60
71
74
78
80
90
92
96
98
101
110
112
114

12'
69
64
31
64
64
69
12'

68
31
68

69
64
31
64
64
69

67b
67a
68
31
57
70

SIMPLIFIED TREMOLO FOR A STRINGED MUSICAL INSTRUMENT

BACKGROUND OF THE INVENTION

The present invention generally relates to a simplified tremolo for a stringed musical instrument having improved string attachment and tuning. More specifically, the invention is directed to a tremolo with a free floating, adjustable double point fulcrum assembly which is mounted in a cavity cut in the stringed musical instrument. The tremolo is provided with an easy string mounting and removing mechanism and a simplified and improved string guide and intonation adjustment assembly. The improved and simplified tremolo is fully adjustable and yet has a compact configuration for versatile applications on various stringed instruments.

BRIEF DESCRIPTION OF THE PRIOR ART

Vibrato devices for stringed musical instruments are well-known in the prior art as evidenced by U.S. Pat. Nos. 5,429,028, 4,795,505; 4,724,737; 4,457,201; 3,466,962; 3,237,502; and by the British Patent Number 905,447.

U.S. Pat. No. 5,429,028, a patent issued to the present inventor, shows a floating one piece tremolo for a stringed instrument comprising a rectangular housing and a carriage pivotally mounted in the housing by means of a floating point mechanism. The carriage is biased against the housing by the action of the instrument strings and a plurality of tremolo springs opposing each other. The carriage of the '028 device is spring biased and provided with string holding keys which are each provided with a locking screw to keep the string eyelet in place in an eyelet basin on each string holding key. This relatively complicated arrangement was eliminated by the present invention which provides a plurality of variably dimensioned through-going apertures on the rotatable portion of the tremolo to receive and hold the eyelets. This improvement results in faster string attachment and removal and a more secure anchoring of the string eyelet. Furthermore, in this '028 embodiment of the floating point tremolo assembly, the points or conical tips were held by support members attached to the sides of the rectangular frame or housing. The present inventive tremolo assembly utilizes a point retention bar located below the surface of and on the interior of the instrument.

Another U.S. Pat. No. 4,457,201 discloses a combined bridge and tailpiece assembly for a stringed musical instrument with a tailpiece member which is manually rotated to produce a vibrato effect. The tailpiece member is rotatably connected at its ends with the tailpiece block through screws having a smaller diameter portion. The screws are threaded into aligned openings of the tailpiece block with the smaller diameter portion of the screws passing through the central portion of ball bearing races mounted in opposite aligned longitudinal openings in the vertical leg portion to connect the vertical leg portion of the tailpiece member at its ends with the tailpiece block of the assembly. Adjustable string attachment devices in the form of inset blocks, (one inset block for each of the instrument strings) are each provided with a thoroughgoing bore to receive a longitudinal rod which passes through aligned openings contained in the base and aligned bores formed in the inset blocks. Each inset block includes a hook portion which holds an eyelet portion of the instrument string end. A plurality of adjustable saddle rollers are connected with the tailpiece block and act as a bridge to guide the respective instrument strings to the string attachment devices. The tailpiece member is spring biased in the opposite direction of rotation to resist the rotating force exerted on the tailpiece member by the tensioned strings, and at least one lever is connected with the tailpiece member for rotating the same relative to the tailpiece block during sounding of the instrument to produce a vibrato effect.

U.S. Pat. No. 3,237,502 discloses a vibrato unit for stringed instruments which includes an adjustable bridge for adjusting the pitch of individual strings. Similarly, U.S. Pat. No. 3,466,962 discloses a tremolo device having an eccentrically mounted cradle member which is rotated relative to a base plate to vary the tone of the sound of the strings. Another U.S. Pat. No. 4,795,505 shows a tremolo arm adjustment mechanism which affects the position and movement of a tremolo arm. The adjustment mechanism consists of an adjustment screw threadedly engaged in an end of a bore on the tremolo and a spring member compressedly disposed within the bore between the tremolo arm and the adjustment screw. The position of the screw within the bore can be adjusted to regulate both the height of the tremolo arm and the force the spring exerts on the end of the tremolo arm to moderate the torsional force exerted on the tremolo arm. Another U.S. Pat. No. 4,724,737 discloses a tuning system for a vibrato guitar. The pivoting motion of the tuning system is facilitated by a pair of holes that are formed toward the front edge of the bridge plate which are formed into knife edges. The knife edges are pivotally coupled to corresponding pivot points of the heads of support screws which screw into brass anchors carried in the top surface of the body of the instrument.

British Patent Number 905,447 patent discloses a vibrato bridge with a base having a pivotal platform. A bridge is arranged on the platform adjacent the pivot and parallel to the axis thereof, and string attachment means are attached to the platform at one side of the bridge and pivot. A lever arm is attached to the platform to pivot the same on the base to change the tension on the strings to produce a vibrato effect.

These and other factors described and illustrated herein result in the point and cone mechanism of the present invention being more stable than the tremolos in the prior art so that the action of the present inventive assembly gives the player greater control over the vibrato effect. As can be seen from a review of the prior art, the present inventive construction greatly reduces the number of parts in the assembly and simplifies the construction of the tremolo.

While the prior art devices allow the user to initially provide the desired musical result, they each possess certain inherent drawbacks which limit their versatility. In order to produce the versatility required from a vibrato device, it is necessary to be able to effectively and efficiently modulate the tension on the strings to achieve the desired vibrato effect and to easily and quickly mount and replace new strings in the instrument. Control over the vibrato effect must be easy for a performer to attain and the device must not be awkward to use, time consuming to adjust, or appear bulky on the face of the instrument. The prior devices do not fulfill all these needs. As an example in U.S. Pat. No. 4,457,201, when the tailpiece member is rotated, tuning problems occur in that the string pitch changes and string breakage is accelerated. In view of the construction of this device, restringing is more difficult and setting intonation is not as easy as in the present invention.

The present invention was developed to provide a combined assembly which is quickly and easily secured to the body of a stringed musical instrument. The assembly has a clean, functional appearance which makes an attractive addition to the instrument while still being completely functional. The assembly includes a rotatable member on which the individual strings are removably mounted and string adjustment saddle mechanisms are disposed, the saddle mechanisms being moveable with respect to each other and characterized by linear and vertical adjustments to position individually each of the same with respect to the strings of the instrument. Furthermore, the vibrato effect produced by the assembly is easily provided owing to the improved means of attaching the tremolo arm to the rotatably mounted portion of the tremolo which incorporates a novel inventive clutch assembly, and a simplified structure of the point and cone mechanism which is used to rotate the rotatable portion of the tremolo to vary the tension in the instrument strings.

SUMMARY OF THE INVENTION

The inventive tremolo assembly of the present invention incorporates an improved point and cone mechanism to provide a mechanism for controllably increasing or decreasing the tension of the instrument strings to provide the desired vibrato effect. The point and cone mechanism advances the tremolo art by providing the instrument player with improved control over the precise amount of the increase or decrease in string tension, simplified tremolo installation in the musical instrument, and a tremolo of simplified mechanical design which stays in tune even under conditions of heavy use. The location of the point and cone mechanism relative to the rotatable portion of the tremolo assembly is one of many factors responsible for the performance characteristics of the tremolo assembly which differ from and are superior to the tremolos of the prior art. The points of the point and cone mechanism are provided on a retention bar which is a stationary component separate from and pivotally engaged with the rotatable portion of the assembly; the retention bar being located below the surface of the instrument.

The improved tremolo assembly also incorporates an improved means of attaching the tremolo arm to the rotatable portion of the tremolo. The tremolo arm in the present invention incorporates a novel adjustable clutch assembly which provides the instrument player with a greater degree of control over the motion and the feel of the tremolo arm. The tremolo assembly also incorporates adjustable saddle members which act as individually adjustable bridge members for each instrument string.

The present inventive tremolo assembly can be adapted to easily attach to stringed instruments of various shapes and sizes that use or already incorporate another type of tremolo. It is therefore possible to remove the tremolos from most guitars and replace them with the present invention with a minimum of rerouting or other structural modification of the instrument.

Accordingly, it is a primary object of the present invention to provide a tremolo assembly embodiment in which a planar member having a integral biasing means attachment block functions as the rotatable portion of the assembly. The point and cone mechanism operates below the planar member and the points are mounted on a separate point retention bar which can be advantageously affixed to a surface on the interior of the instrument body. The mounting mechanism of the rotatable portion of the invention is a floating point fulcrum system, also referred to as the point and cone mechanism, extending from the point retention bar and engaging the cone bar on the planar member. A planar member section substantially covers the cavity cut in the top of the stringed instrument and is substantially co-planar with the top surface of the musical instrument. Thus, the top of the planar member and the tremolo components affixed thereon are all that is visible of the tremolo after it is installed in the musical instrument. There are no pivot parts or screws protruding from the surface of the guitar because all of the components of the tremolo are affixed to the planar member of the tremolo assembly.

The top surface of the saddle platform is used as a locus for mounting tremolo parts including the tremolo arm and a plurality of individual members called saddles which function as individually adjustable bridges for each string.

Accordingly, it is an object of the present invention to provide a tremolo assembly which incorporates a point and cone mechanism below the saddle platform in the interior of the instrument.

It is also an object of the present invention to provide a tremolo assembly which incorporates the novel clutch mechanism for holding and biasing the tremolo arm which enables the user to precisely adjust the torsional frictional force exerted against the tremolo arm and to maintain the selected frictional force even during intense playing of the instrument.

It is a further object of the present invention to provide a plurality of appropriately shaped and positioned apertures on the tremolo assembly to enable the player of the instrument to simply and rapidly attach and remove the instrument strings.

It is another object of this invention to provide a simplified tremolo design that allows easy installation on a variety of stringed instruments including simplified retrofitting of the tremolo assembly on instruments that already have another type of tremolo installed thereon.

Still another object of this invention is to provide a tremolo assembly which stays in tune even under intense use.

A further object of the present invention is to provide a tremolo which can either raise or lower the pitches of the notes which are produced by the strings in their equilibrium positions and which allows for a greater range of motion of the rotatable portion of the tremolo than presently available enabling the player to accomplish a greater degree of tremolo pullback and a greater degree of tremolo dive than that which is possible with prior art tremolos.

Yet another object of the present invention is to provide an improved point and cone fulcrum mechanism which positions the fulcrum away from the edge of the saddle platform such that moving the tremolo arm a given angular distance results in a greater degree of rotation of the saddle platform than would be possible using the technology of the prior art.

In the accompanying drawings, there is shown an illustrative embodiment of the invention from which these and other objectives, novel features and advantages will be readily apparent.

DETAILED DESCRIPTION OF THE INVENTION

Figure 1:
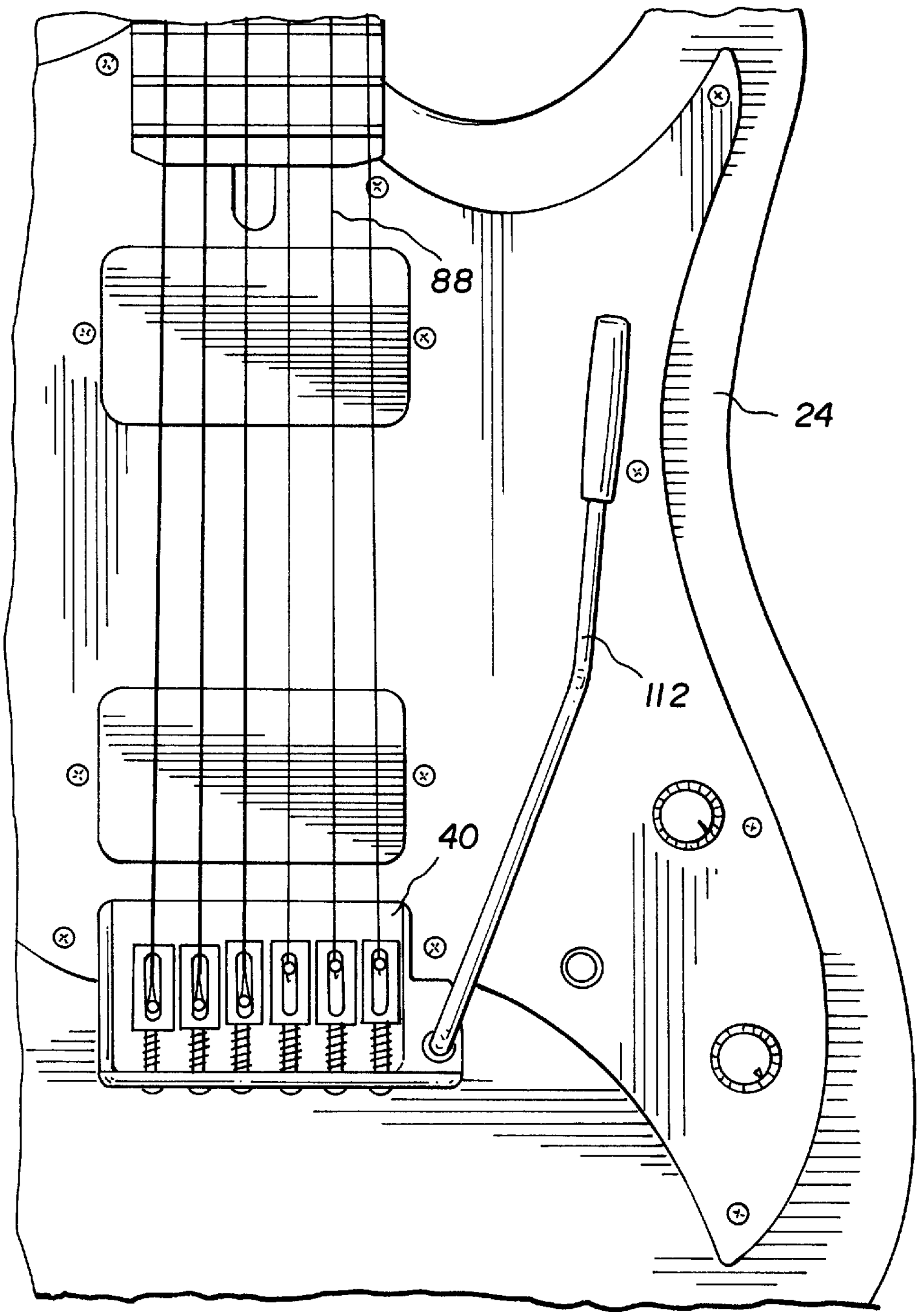
FIG. 1 is a top plan view of the simplified tremolo invention mounted in a guitar.
Figure 2:
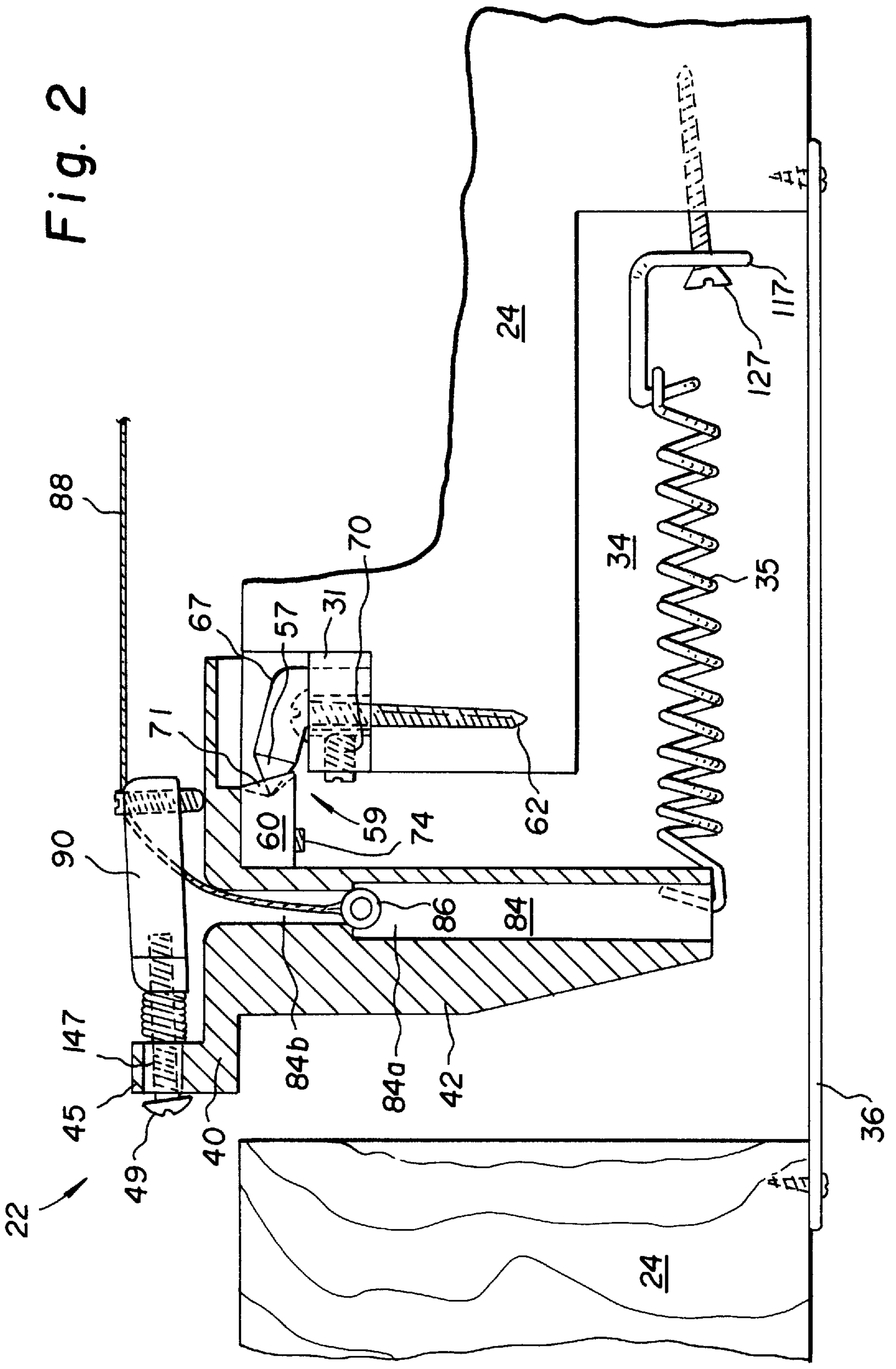
FIG. 2 is an enlarged cross sectional side view of the tremolo shown in FIG. 1 showing the tremolo mounted in the cavity of the guitar with saddle platform and saddle assembly, the point and cone mechanism, and the spring and claw assembly.

The preferred embodiment and the best mode of the invention is shown in FIGS. 1–19. In accordance with the invention, the improved, simplified tremolo assembly, generally designated 20, is mounted into a cavity cut into stringed musical instrument 24 as shown in FIGS. 1 and 2. The instrument body 24 is routed or formed to create a cut out 29 for the installation of the point retention bar 31 and a cavity 34 to receive the tremolo housing 37 and coil springs 35. A cavity plate 36 is mounted by screws or other means to the back of the body of the instrument 24 covering the spring cavity 34.

Figure 4:
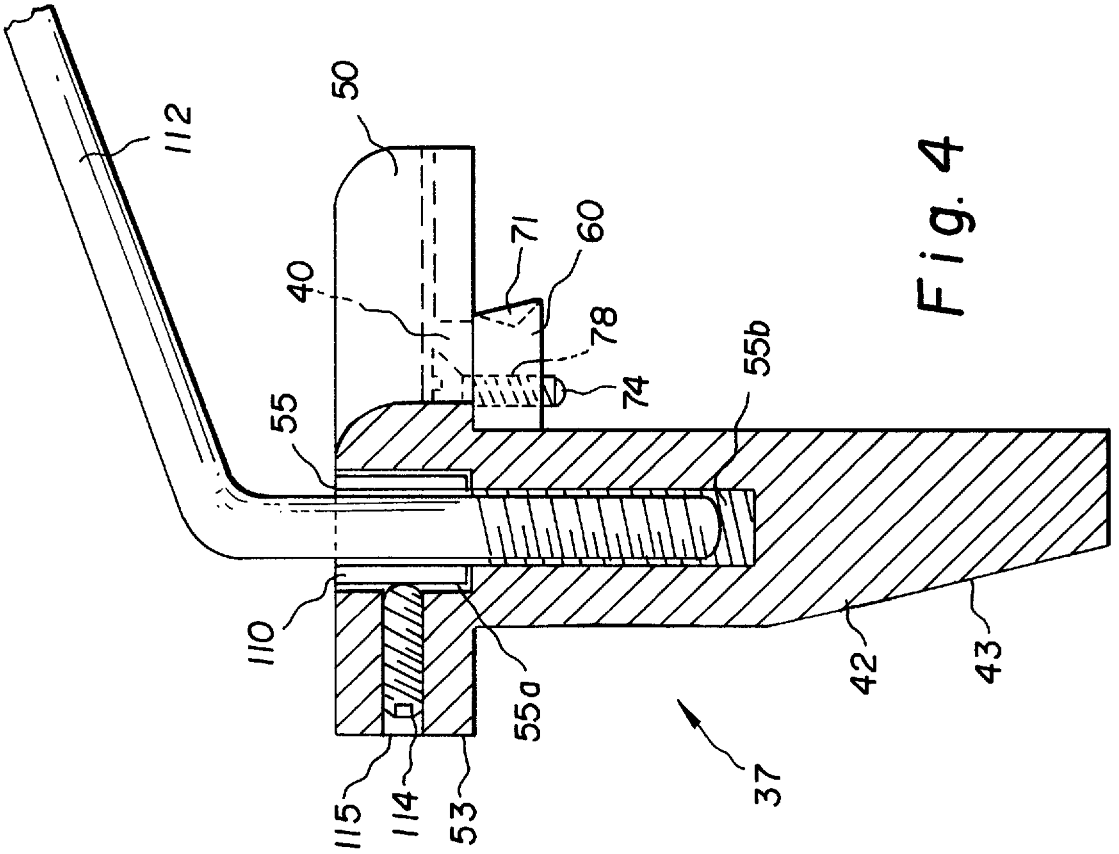
FIG. 4 is a cross sectional side view of the saddle platform with the integral spring mounting block showing the clutch assembly and the tremolo arm.
Figure 3:
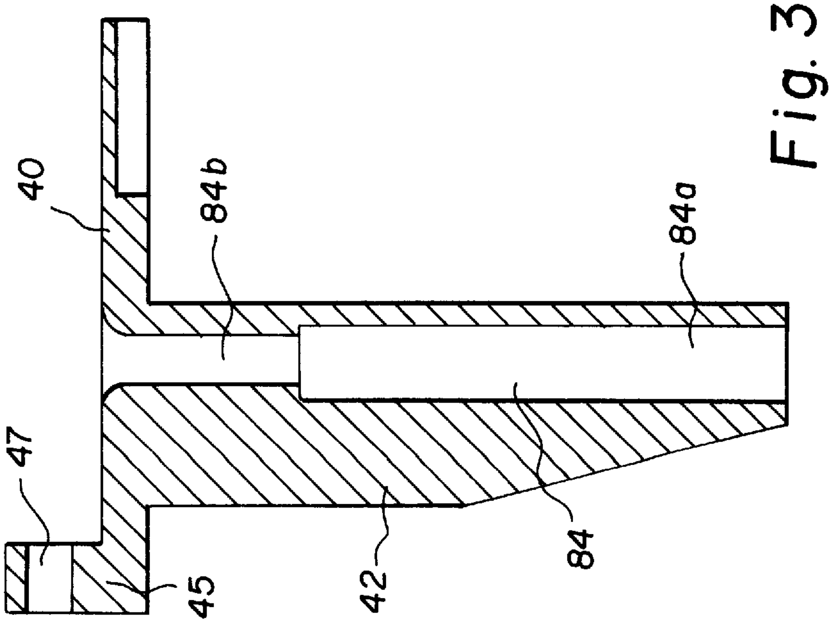
FIG. 3 is an isolated cross sectional view of the saddle platform with the integral spring mounting block shown in FIG. 2.
Figure 5:
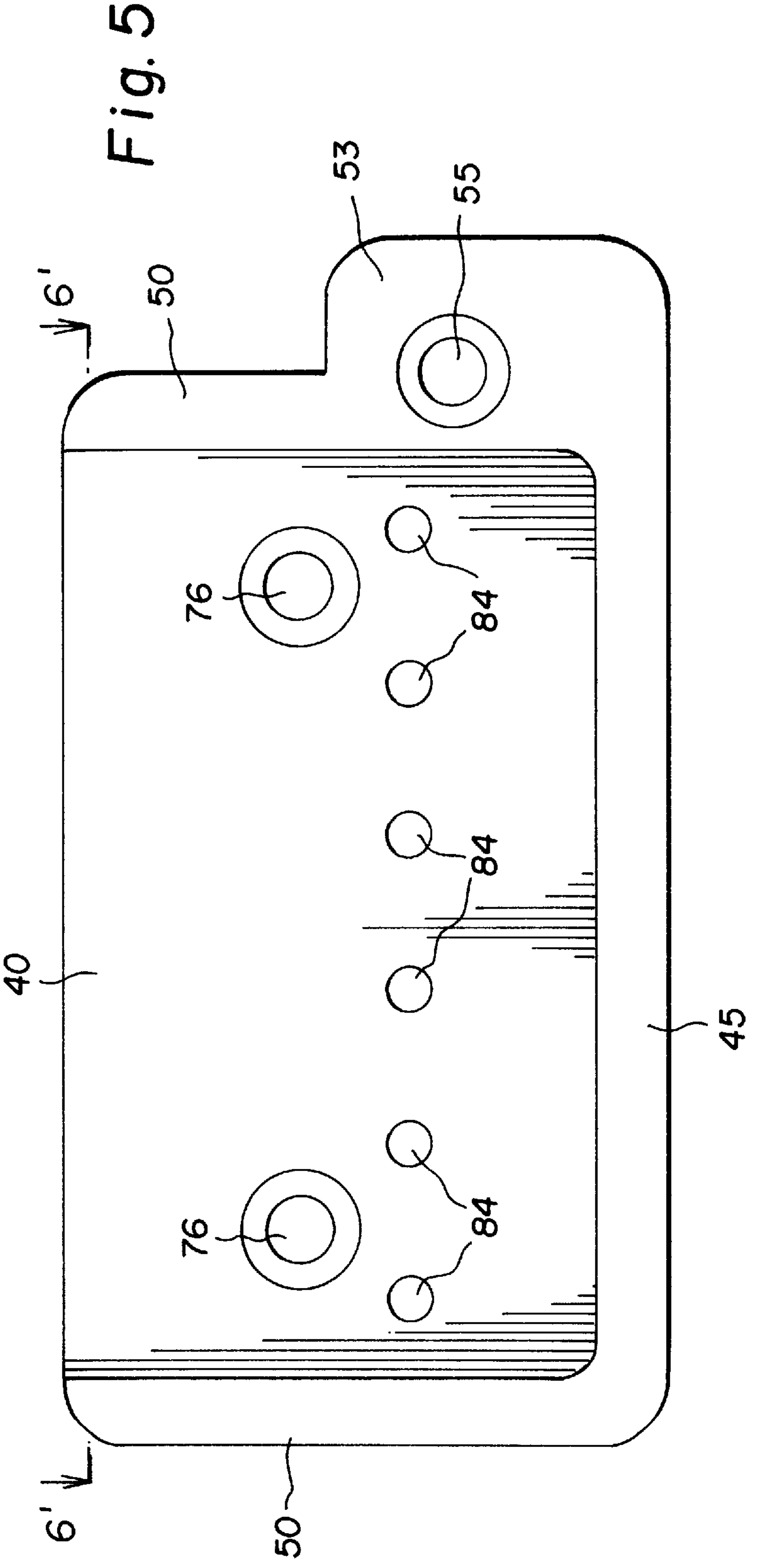
FIG. 5 is an enlarged top plan view of the saddle platform.
Figure 6:
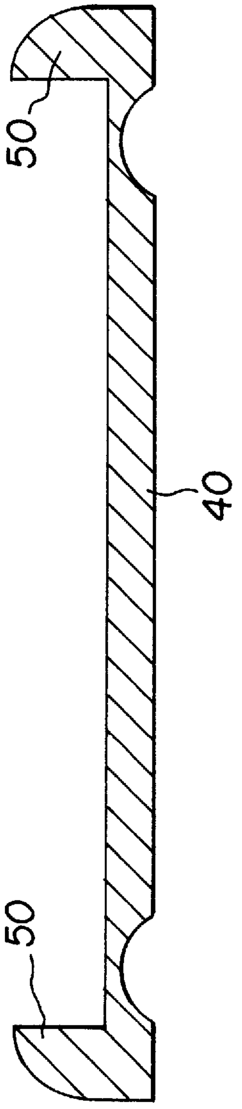
FIG. 6 is an enlarged cross sectional view of the proximal end of the saddle platform of FIG. 5 taken along line 6'—6'.

The pivoting body or saddle plate assembly 37 of the tremolo assembly is shown in FIGS. 2, 3, and 4. The body 37 comprises the saddle platform 40 shown in phantom in FIG. 4 and the integral spring mounting block 42. The saddle platform 40 which is shown in plan view in FIG. 5 is provided with upright walls or flanges on three sides so that the saddle platform is a three quarters enclosed area leaving an open edge on the saddle platform 40. The distal flange 45 extends the length of the distal edge of the saddle platform 40 and is joined to two lateral flanges 50 which extend the length of the two lateral sides of the saddle platform 40 to form one integral and continuous flange surrounding the three sides of the saddle platform 40. The distal flange 45 has a plurality of through-going smooth saddle slide bores 47 shown in phantom in FIG. 7 to accommodate the saddle screws 49. A tremolo arm block 53 extends outward from one lateral saddle platform flange 50 and serves as the location for the tremolo arm bore 55.

The conical tips 57 of the point and cone mechanism, generally designated 59 in FIG. 2, are held on a separate point retention bar 31 which is affixed to the interior of the instrument body 24 by screws 62. The point and cone assembly 59 therefore operates below the saddle platform 40 and is not visible to the instrument player. The point retention bar 31 is secured to the interior of the instrument body 24 by screws 62 which pass through three countersunk smooth retention bar screw bores 64 into the instrument body 24. The conical tips 57 are formed on the ends of two angular cylindrical support posts 67.

Figures 10, 11, 12, 13:
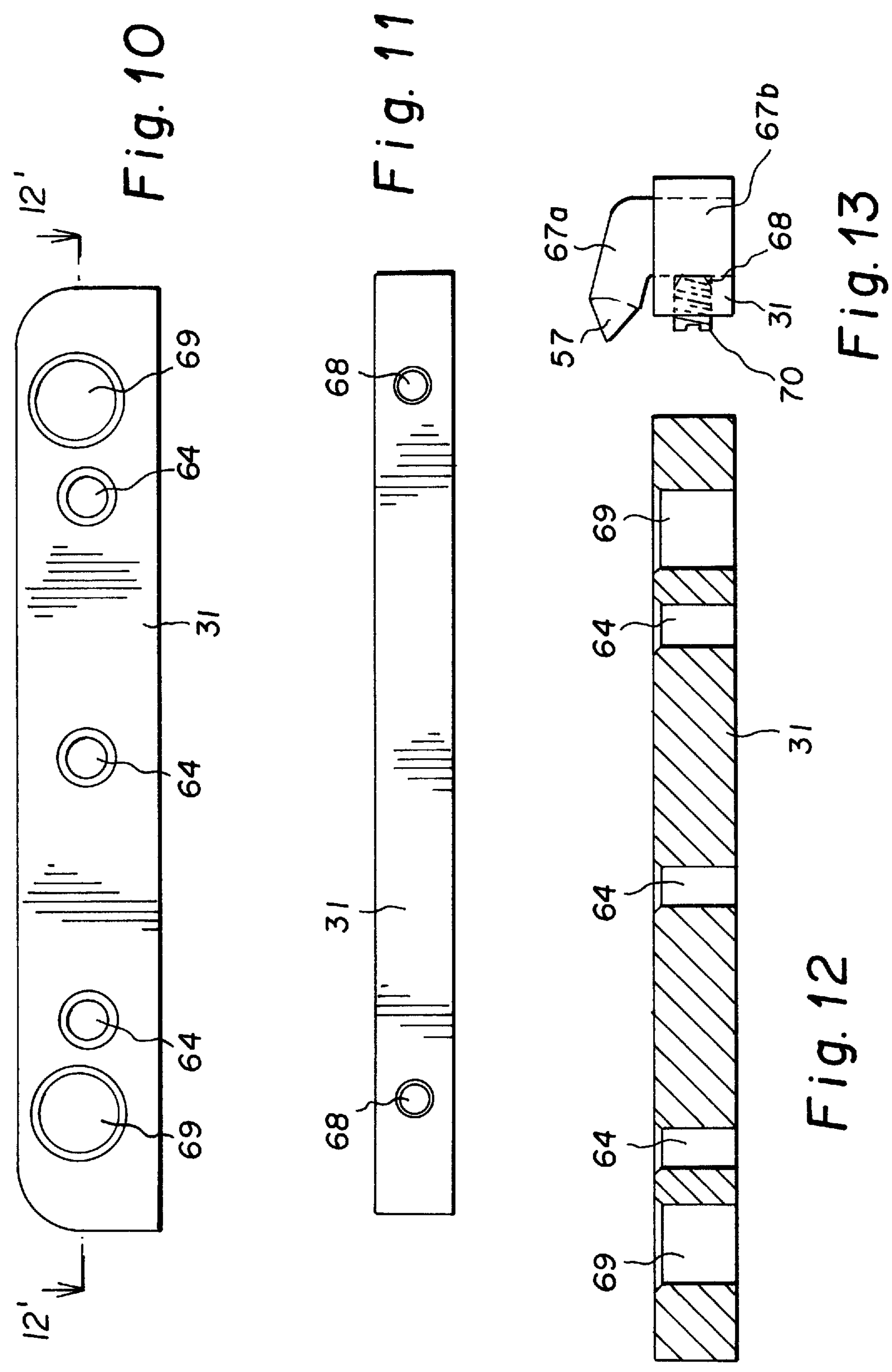
FIG. 10 is an enlarged top plan view of the point retention bar.
FIG. 11 is an enlarged side view of the point retention bar of FIG. 10 taken from the distal end.
FIG. 12 is a cross section of the point retention bar of FIG. 10 taken along line 12'—12'.
FIG. 13 is an enlarged side view of the cone bar showing the conical tip of the point and cone in place.

Each cylindrical support post is identically bent at an angle slightly greater than 90 degrees to form an upper cylindrical support post section 67*a* and a lower cylindrical support post section 67*b*. The upper cylindrical support post section 67*a* is angled upward slightly from the 90 degree position to allow for the maximum rotation of the saddle platform 40 when it is rotated in the clockwise direction. This relationship is best seen in FIG. 2. The two cylindrical support posts 67 are mounted within two smooth retention bar bores 69 and held removably there by the set screws 70 which are located in the threaded bores 68 as is shown in FIG. 13. The conical tips 57 of the fulcrum pivotally engage a pair of identical large diameter conical or circular cavities 71. These conical cavities 71, which are also referred to as cones, are cut into a cone bar 60 which is located beneath the saddle platform 40 and secured thereto by screws 74 as is clearly shown in FIG. 8. The screws 74 pass through smooth countersunk bores 76 in the top surface of the saddle platform 40 (see FIG. 5) into two aligned threaded bores 78 in the cone bar 60. An arcuate or crescent-shaped support post indentation 80 is provided along the proximal edge of the bottom of the saddle platform 40 to allow greater clockwise rotation of the platform 40 before the bottom of the platform 40 comes into contact with the cylindrical support posts 67.

This positioning of the point and cone mechanism or fulcrum under the saddle plate improves the appearance and performance of the installed tremolo assembly and provides a means for rotating the rotatable portion of the tremolo assembly. Since the fulcrum is located below the surface of and away from the proximal edge of the saddle plate in the interior of the musical instrument, the angular distance the handle has to move to achieve a given angular displacement or rotation of the saddle plate is reduced by as much as 23% over the standard tremolo. This translates into as much as 23% less movement of the tremolo arm for any desired effect. The position of the fulcrum of the point and cone mechanism also allows the saddle platform to lie parallel to and in substantially the same plane as the surface of the guitar. The anatomy of the tremolo cavity allows for extreme pull-back, a quality practically non-existent in current tremolos. The shape of the cavity required to affix the internal point and cone mechanism and associated rotatable saddle plate assembly allow for easy installation of the assembly and easy retrofitting of most guitars. The shape of the cavity required also allows for quick, easy installation of the point and cone process and with a very minimal amount of re-routing this system will retro-fit virtually any guitar equipped with a standard classic tremolo.

A spring mounting block 42 is integrally formed with the saddle platform 40. The spring mounting block 42 extends into an interior cavity 34 of the instrument 24 to provide a means for attaching the coil springs 35 thereto. The lower half 43 of the distal side of the spring mounting block is tapered to allow greater clockwise movement of the platform 40 before the spring mounting block 42 contacts the instrument body 24. A series of string bores 84 extend through the saddle platform 40 and block 42 to provide a means for removably securing the eyelet 86 ends of the strings 88 to the tremolo 20. Each smooth string bore has a stepped construction with wider lower portion 84*a* and a narrower upper portion 84*b*. The string is attached by passing one end of the string 88 into the wider portion 84*a* of the bore 84, through the narrower portion of the bore 84*b* and out the top of the saddle platform 40. The string is pulled or drawn through the bore 84 until the string eyelet 86 comes into contact with the shoulder beginning of the narrower portion of the bore. This provides the user with a fast and easy way to attach the strings 88 or remove the strings from the tremolo 20.

Figures 7, 8, 9:
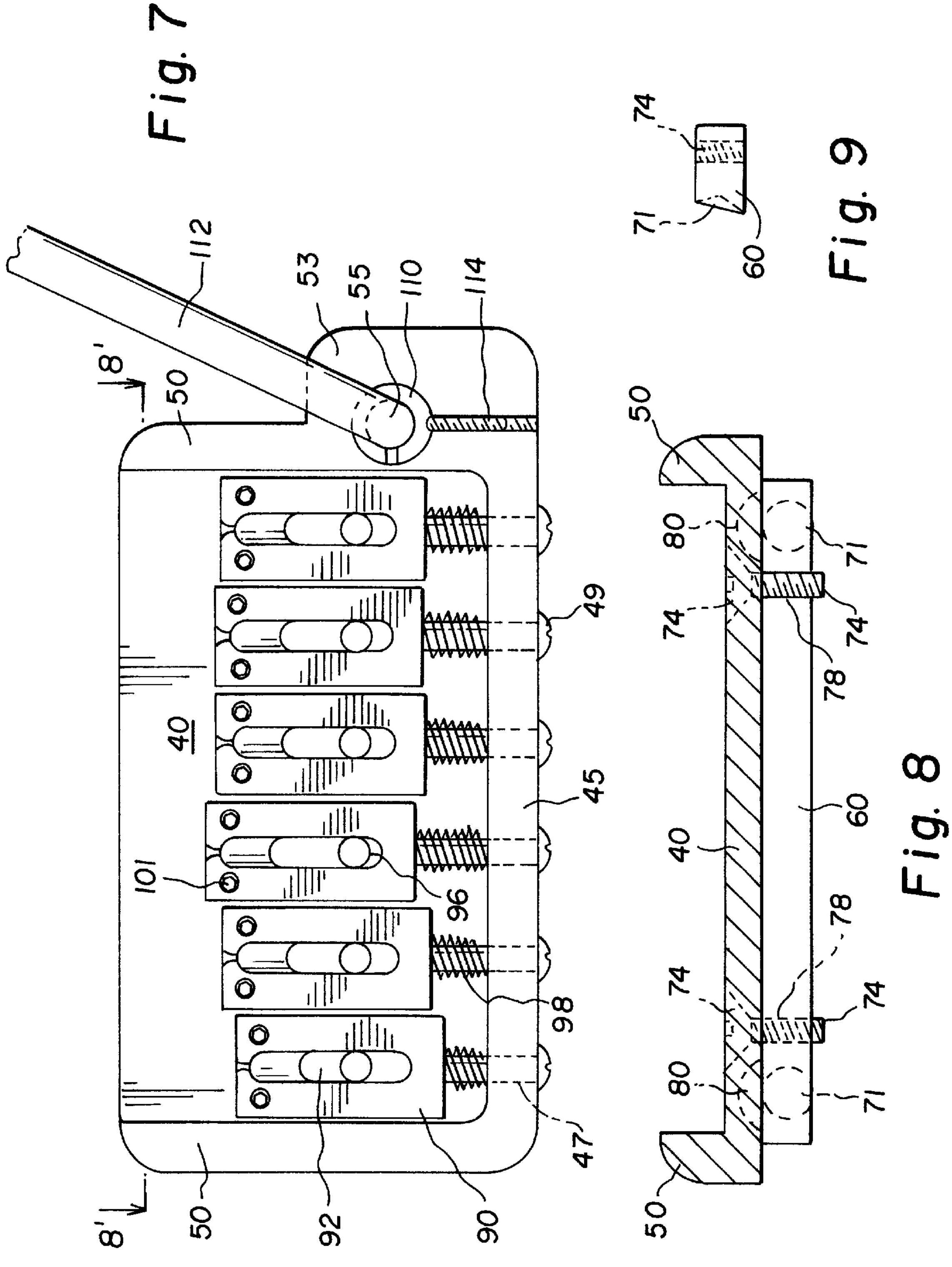
FIG. 7 is a top plan view of the saddle platform shown in FIG. 5 with the saddles, tremolo arm and clutch assembly in place.
FIG. 8 is a cross sectional view of the proximal end of the saddle platform of FIG. 7 taken along line 8'—8'.
FIG. 9 is an enlarged side view of the cone bar.
Figure 14:
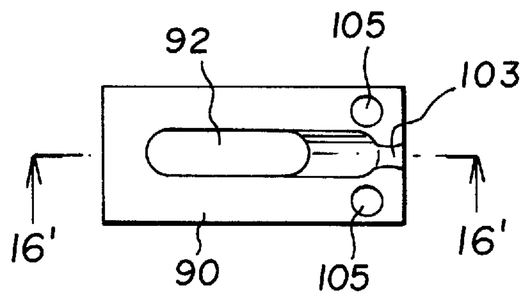
FIG. 14 is an enlarged top plan view of a saddle.
Figure 15:
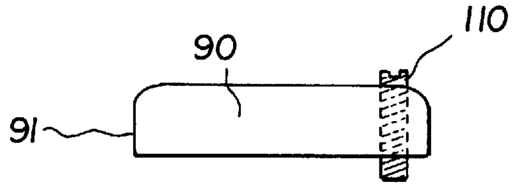
FIG. 15 is an enlarged side view of the saddle of FIG. 14.
Figure 16:
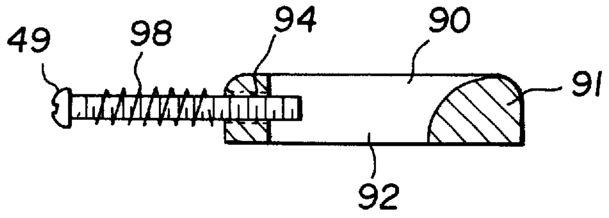
FIG. 16 is a cross sectional side view of the saddle of FIG. 14 taken along the line 16'—16'.
Figure 17:
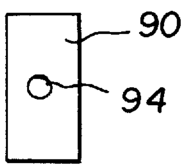
FIG. 17 is an enlarged end view of the saddle of FIG. 14.

A plurality of saddles 90 as shown in FIGS. 14 through 17 are positioned on the top of the saddle platform 40 in the enclosed surface. The saddles 90 function as bridges for each string, there being one saddle provided for each string. Each saddle body 91 defines a central elongated aperture 92 and a threaded screw bore 94. Each saddle 90 is placed over a string bore 84 as shown in FIG. 7 and a screw 49 is inserted through the distal side of each bore 47 in the wall 45 and then into the threaded saddle body bores 94 of each saddle 90. These screws enable the player to slide the saddles 90 individually in a longitudinal path to change the position of the saddle. A biasing spring 98 is placed around each screw to bias the saddle 90 away from the distal wall 45 toward the neck of the instrument. The instrument strings guide the longitudinal movement of the saddles 90 and keep them aligned. The proximal end of each saddle 90 is provided with a pair of height adjustment screws 101 as shown in FIG. 15 and the saddle end defines a string notch 103 between the height adjustment screws. Screws 101 extend through a pair of threaded height adjustment bores 105 as shown in FIG. 14 and are used to adjust the height of notch 103 which serves as the bridge of the saddle 90, above the platform 40.

Intonation of the instrument strings occurs after mounting the instrument strings in the string attachment bores by moving the saddles longitudinally and by adjusting the saddle height relative to the saddle plate. The individual screws 49 attached to the saddles through thorough-going apertures in the flange located on the posterior edge portion of the saddle plate longitudinally adjust the saddles. Springs 98 are mounted around each screw 49 between the flange 45 and each saddle 90 to bias the saddles away from the flange. The saddle height is adjusted by a plurality of paired threaded fasteners provided in a pair of through-going bores located at the proximal end of the saddle members.

A partially threaded bore 55 extends through the tremolo arm block 53 and into the spring mounting block 42. As shown in FIG. 4 the bore 55 consists of a stepped axially aligned wider smooth section 55*a* and a threaded section 55*b*. The wider smooth section 55*a* holds a clutch 110 for the tremolo arm 112. The clutch 110 is a cylindrical piece of material selected to provide, in combination with the pressure applied by a set screw 114 passing through the threaded set screw bore 115, a consistent frictional force against the tremolo arm 112. The clutch material can be constructed of several materials including Teflon or various types of plastics or other natural or synthetic materials. The clutch mechanism can also be formed of material which make it capable of resilient deformation in some embodiments to provide a more sensitive feel to the player. The tremolo arm 112 is used to rotate the saddle platform 40 and associated structures. The novel clutch assembly provides for easier, more sensitive playing and a more durable tremolo arm connection. The clutch assembly provides the user with an improved means of adjusting and maintaining the frictional force between tremolo arm and the rotatable portion of the tremolo to provide a smoother rotation of the tremolo arm in a path above the surface of the musical instrument so that the player can easily and reliably rotate the handle relative to the saddle platform to move the tremolo arm toward or away from the strings of the instrument to change the string tension while playing. The instrument player will frequently desire the tremolo arm 112 to be moved away from the strings 88 so that the instrument can be played without using the arm 112 to rotate the tremolo assembly. In this case the player rotates the tremolo arm 112 so that it is no longer over the strings 88. Consequently, the tremolo arm 112 is rotated back and forth many times during a performance. The clutch 110 assures that the tremolo arm 112 does not become loose but rather maintains a consistent action by ensuring that the torsional frictional force between the tremolo arm 112 and clutch 110 remains approximately constant.

When the saddle is in place on the instrument 24, the cone bar 60 and associated cones 71 are biased against the conical tips 57 to create a fulcrum. The biasing forces are caused by the tension in the strings 88 on one side of the fulcrum and by the tension in the coil springs 35 on the other. The plurality of coil springs 35 are secured to an inside surface of the instrument 24 through the spring and claw assembly 117.

Figure 18:
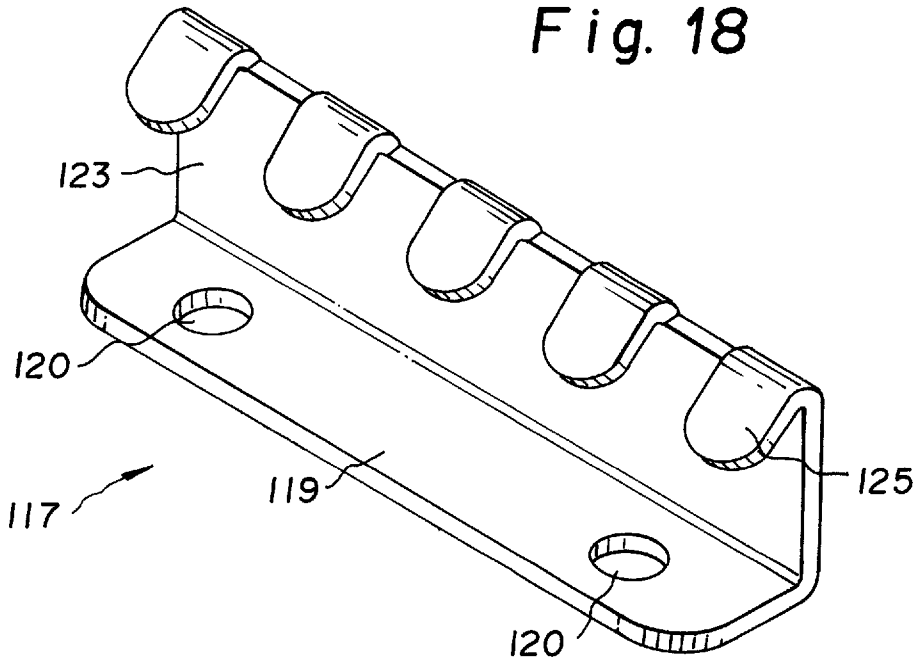
FIG. 18 is an enlarged perspective view of the spring claw assembly.
Figure 19:
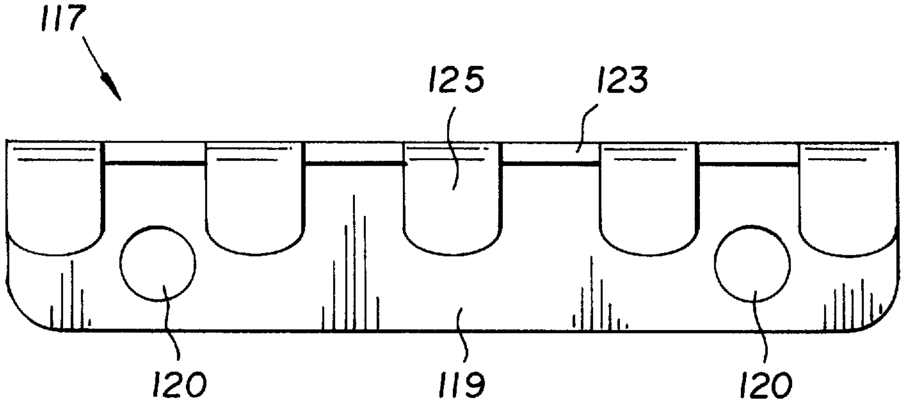
FIG. 19 is a top plan view of the spring claw assembly of FIG. 18.

The spring and claw assembly 117 is shown in detail in FIGS. 18 and 19. The claw has a base 119 with screw holes 120 and a back section 123 that holds several claws 125 angled at approximately 45 degrees from the plane of the back section. The claws 125 are evenly spaced to provide a balanced force against the spring mounting block 42. The base 119 is secured to the instrument body 24 by screws 127. The spring force can be adjusted by changing the depth to which the screws 127 penetrate the instrument body 24. The coil springs 35 are secured to the spring mounting block 42 by placing the hook ends of the springs 35 in the respective bores 84 as shown in FIG. 2.

It can thus be seen that the saddle plate portion of the tremolo assembly incorporates an integral mounting block which serves as the locus of attachment for a coil spring assembly to provide part of the biasing necessary to bias the cone bars against the conical tips. The plurality of springs connected to the block resist the rotating force exerted on the block and saddle plate or platform by the tensioned strings and thus hold the rotating portion of the tremolo in equilibrium until the player depresses or pulls back on the tremolo arm. The top of the saddle platform and instrument strings guide the longitudinal motion of the saddles along the direction of the strings to perform the bridging function. The tremolo assembly provides the user with an easy and convenient way of installing and removing strings on the instrument by providing the user with a plurality of appropriately shaped bores on the rotatable portion of the assembly to secure the eyelets on the strings to the assembly and at the same time allow easy passage of the strings out of the tremolo assembly toward the tuning pegs on the head of the instrument. In the forgoing description, the invention has been described with reference to a particular preferred embodiment, although it is to be understood that specific details shown are merely illustrative, and the invention may be carried out in other ways without departing from the true spirit and scope of the following claims:

I claim:

1. A string mounting and tuning device for use in the body of a stringed instrument, comprising:

(a) a member with a planar surface pivotally disposed within an opening in the surface of said body of said stringed instrument with said planar surface of said member being substantially coplanar with said surface of said body in an unpivoted position;

(b) string attachment means disposed in said member to hold one end of each string of said stringed instrument;

(c) string support means movably mounted on said planar surface of said member;

(d) pivot point means secured to an interior surface of said stringed instrument to create a plurality of pivot points for said member;

(e) pivot point receiving means provided on said member below said planar surface to pivotally receive said pivot point means;

(f) biasing means for biasing said pivot point receiving means on said planar member against said pivot points; and (g) arm means attached to said member to control the pivoting action of said member with said planar surface.

2. A string mounting and tuning device as claimed in claim 1, wherein said string support means comprises a plurality of linearly and angularly adjustable string saddle guides, each of said string saddle guides being provided with means for a string to pass from the member through the string saddle guide along a groove defined on the top of the string saddle guide to guide the string to the stringed instrument.

3. A string mounting and tuning device as claimed in claim 2, wherein each string saddle guide is provided with a pair of adjustable threaded supports, each support being disposed in threaded bores on opposite sides of said groove to adjust the height the end of the string saddle guide.

4. A string mounting and tuning device as claimed in claim 2 wherein said member is provided with a saddle support plate with a flange at the distal end thereof, said flange being provided with a plurality of apertures, each aperture providing a means of passage for a longitudinal adjustment screw so that each longitudinal adjustment screw extends through the respective aperture and threadably engages a string saddle guide allowing the position of each saddle guide to be selectively adjusted by turning said longitudinal adjustment screw and a plurality of saddle spring members, each saddle spring member being disposed around one of said longitudinal adjustment screws between said string guide saddle and said flange to bias said string saddle guide away from said flange.

5. A string mounting and tuning device as claimed in claim 1 wherein said pivot point means is secured to an interior surface of said stringed instrument to create a plurality of pivot points to pivotally engage said planar member comprises a pivot base member secured to the interior of said instrument and a plurality of conical tip means secured to said pivot base.

6. A string mounting and tuning device as claimed in claim 5 wherein said conical tip means comprises a plurality of rod members secured to said pivot base and a plurality of cone shaped tips formed on the ends of said rods such that said cone shaped tips extend beyond the edge of said pivot base to engage said pivot point receiving means provided on said planar member.

7. A string mounting and tuning device as claimed in claim 6 wherein each rod member of said plurality of rod members is connected to the top of said pivot base and bent at approximately ninety degrees so that the conical tips are above the top surface and extend slightly beyond the edge of said pivot base to pivotally engage said pivot point receiving means provided on said planar member.

8. A string mounting and tuning device as claimed in claim 1 wherein said pivot point receiving means are provided on the bottom of said planar member to pivotally receive said pivot point means, said pivot point receiving means comprising a point block secured to said planar member, and a plurality of conical depressions formed in said point block to pivotally receive said conical tips to create a fulcrum mechanism to rotate said planar member.

9. A string mounting and tuning device for use in the body of a stringed instrument, comprising:

(a) a housing defining a planar section with a planar surface and an integral string support block extending from said planar section, said housing being pivotally pivotally mounted within a cavity in said body of said stringed instrument such that said planar surface is normally oriented so that it is substantially coplanar with an outer surface of said body of said stringed instrument;

(b) string attachment means disposed in said housing to hold one end of each string of said stringed instrument;

(c) string support means movably disposed on the planar surface of said planar section;

(d) pivot point means secured to an interior surface of said stringed instrument body to create a pivot point for said housing;

(e) pivot point receiving means provided on said housing to pivotally receive said pivot point means;

(f) biasing means for biasing said pivot point receiving means against said pivot point; and (g) arm means mounted to said housing to control the pivoting of said housing, said arm means comprising an angularly shaped rod rotatably disposed within a bore defined by said housing and adustable clutch means disposed within said handle bore surrounding at least a portion of said rod to control the torsional frictional force exerted on said rod.

10. A string mounting and tuning device as claimed in claim 9 wherein a plurality of string bores each extend from an opening in the top of said planar section to an opening in the bottom of said string support block to provide a plurality of passages for the strings of the instrument and string attachment means disposed in each of said plurality of string bores.

11. A string mounting and tuning device as claimed in claim 10 wherein each of said string bores is stepped and comprises a narrower portion at the top of the string bore where the bore exits the housing at the planar surface and a wider portion at the opposite end of said string bore such that an eyelet on the string can pass through the wider portion and cannot pass through the narrower portion.

12. A string mounting and tuning device for use in the body of a stringed instrument, comprising:

(a) a housing pivotally disposed within a cavity in said body of said stringed instrument such that a planar surface of said housing is substantially coplanar with said surface of said stringed instrument body;

(b) string attachment means disposed in said housing to hold an eyelet of each string of said stringed instrument;

(c) string support means comprising a plurality of carriage members movably mounted on a planar surface of said housing;

(d) pivot point means secured to an interior surface of said stringed instrument to create a plurality of pivot points to pivotally engage said housing;

(e) pivot point receiving means provided beneath said planar surface of said housing member to pivotally receive said pivot point means;

(f) biasing means for biasing said pivot point receiving means on said housing against said pivot points; and (g) a tremolo arm attached to said housing to control the pivoting of said housing in said cavity of the stringed instrument body with clutch means engaging said handle means.

13. A string mounting and tuning device as claimed in claim 12 wherein said clutch means comprises a sheet of resilient elastic material residing in a bore of said housing and substantially surrounding said tremolo arm to provide a substantially constant torsional frictional force on said arm and means for adjustably biasing said elastic material against said arm to control said torsional frictional force.

14. A string mounting and tuning device for use in the body of a stringed instrument, comprising:

(a) an L-shaped member pivotally disposed within a cavity in said body of said stringed instrument such that a surface of said L-shaped member is substantially coplanar with said surface of said body; said L-shaped member comprising a saddle platform and a biasing means attachment block;

(b) string attachment means disposed in said biasing means attachment block to hold one end of each string of said stringed instrument;

(c) string support means movably mounted on said surface of said L-shaped member;

(d) pivot point receiving means provided beneath said surface of said L-shaped member to pivotally receive pivot points means;

(e) pivot point means engaging said pivot point receiving means to create a plurality of pivot points within said stringed instrument for said L-shaped member;

(f) biasing means for biasing said pivot point receiving means on said L-shaped member against said pivot points, said biasing means comprising a plurality of spring members secured at one end to said biasing means attachment block of said L-shaped member and secured at the other end to a spring anchoring means secured to the interior of said stringed instrument, said plurality of spring members acting together to balance the rotational force exerted on the L-shaped member caused by the instrument strings; and (g) a rotatable tremolo arm mounted to said L-shaped member to control the selective clockwise or counter clockwise pivoting of said L-shaped member.

15. A string mounting and tuning device as claimed in claim 14 wherein said spring anchoring means is a claw member comprising a planar claw base, a planar claw back section secured to said claw base at about a substantially right angle and a plurality of claw hooks secured to said claw back at about a 45 degree angle, said claw hooks engaging the ends of said spring members and said claw base being provided with means for attaching said claw member to an interior surface of said instrument.

16. A string mounting and tuning device as claimed in claim 15 wherein said means for attaching said claw assembly to an interior surface of said instrument comprises a plurality of thoroughgoing apertures in said claw base and a plurality of screws passing through said claw base apertures to secure said claw assembly to said instrument in an interior cavity of the instrument.

17. A string mounting and tuning device as claimed in claim 14, wherein said string support means comprises a plurality of linearly and angularly adjustable string saddle guides, each of said string saddle guides being provided with means for a string to pass from the member through the string saddle guide along a groove defined on the top of the string saddle guide to guide the string to the stringed instrument.

18. A string mounting and tuning device as claimed in claim 17, wherein each string saddle guide is provided with a pair of adjustable threaded supports, each support being disposed in a threaded bore on opposite sides of said groove to adjust the height of the end of the string saddle guide.

19. A string mounting and tuning device as claimed in claim 14 wherein said saddle platform section has a saddle support plate with a flange at the distal end thereof, said flange being provided with a plurality of apertures, each aperture providing a means of passage for a longitudinal adjustment screws so that each longitudinal adjustment screw extends through an aperture and threadably engages a string saddle guide allowing the position of each saddle to be adjusted by turning the respective longitudinal adjustment screw and a plurality of saddle spring members, each saddle spring member being disposed around one of said longitudinal adjustment screws between said string guide saddle and said flange to bias said string saddle guide away from said flange.

* * * * *